(12) United States Patent
Styles et al.

(10) Patent No.: US 9,587,596 B2
(45) Date of Patent: Mar. 7, 2017

(54) ASYMMETRIC EXHAUST GAS RECIRCULATION SYSTEM

(75) Inventors: Daniel Joseph Styles, Canton, MI (US); James Hilditch, Canton, MI (US); Michael Howard Shelby, Plymouth, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 918 days.

(21) Appl. No.: 13/372,335

(22) Filed: Feb. 13, 2012

(65) Prior Publication Data

US 2013/0205774 A1    Aug. 15, 2013

(51) Int. Cl.
| F02B 33/44 | (2006.01) |
| F02B 29/04 | (2006.01) |
| F02B 33/00 | (2006.01) |
| F02M 25/07 | (2006.01) |
| F02B 47/08 | (2006.01) |
| F02M 25/06 | (2016.01) |

(52) U.S. Cl.
CPC ............ *F02M 26/43* (2016.02); *F02M 26/08* (2016.02); *F02M 26/24* (2016.02); *F02M 26/28* (2016.02); *F02M 26/47* (2016.02); *F02B 29/0406* (2013.01); *F02B 47/08* (2013.01); *F02M 25/06* (2013.01)

(58) Field of Classification Search
CPC ........... F02M 25/0711; F02M 25/0732; F02M 25/0749; F02M 25/0754; F02M 25/0731; F02M 25/06; F02M 26/08; F02B 47/08; F02B 29/0406; F02B 37/007; F02B 37/001; Y02T 10/121

USPC ................. 60/605.2, 612; 123/568.11, 559.1
See application file for complete search history.

(56) References Cited

U.S. PATENT DOCUMENTS

| 4,428,192 | A  | * | 1/1984 | Dinger et al. ................... 60/606 |
| 5,611,202 | A  | * | 3/1997 | Sumser ................. F02B 37/007 60/612 |
| 7,975,478 | B2 | * | 7/2011 | Zielke ................... F02B 37/007 60/612 |
| 2007/0193564 | A1 | * | 8/2007 | Takahashi ............. F02B 37/007 60/612 |
| 2009/0090098 | A1 | * | 4/2009 | Sugiyama ............. F02B 37/007 60/287 |
| 2010/0300413 | A1 | * | 12/2010 | Ulrey ........................ F02D 9/12 123/518 |
| 2011/0132342 | A1 | * | 6/2011 | Soltis .................. F02D 41/0025 123/703 |

(Continued)

FOREIGN PATENT DOCUMENTS

EP    1873366 A1    1/2008

*Primary Examiner* — Nicholas J Weiss
*Assistant Examiner* — Ngoc T Nguyen
(74) *Attorney, Agent, or Firm* — Julia Voutyras; John D. Russell; B. Anna McCoy (57) ABSTRACT

Systems and methods for a twin turbocharged engine with a single exhaust gas recirculation (EGR) system are disclosed. In one example approach a system is provided comprising a first turbocharger in a first intake passage with a low-pressure EGR system fluidically coupling exhaust exiting the first turbocharger to intake air entering the first turbocharger, and a second turbocharger in a second intake passage without a low-pressure EGR system fluidically coupling exhaust exiting the second turbocharger to intake air entering the second turbocharger.

15 Claims, 4 Drawing Sheets

(56) References Cited

U.S. PATENT DOCUMENTS

| | | | |
|---|---|---|---|
| 2011/0265771 A1* | 11/2011 | Banker | F02B 37/007 123/564 |
| 2011/0302919 A1* | 12/2011 | Schlemmer-Kelling | F01N 5/04 60/605.2 |
| 2012/0023937 A1* | 2/2012 | Styles et al. | 60/605.2 |
| 2013/0019594 A1* | 1/2013 | Styles et al. | 60/605.2 |
| 2014/0251285 A1* | 9/2014 | Surnilla | F02M 26/06 123/568.11 |

* cited by examiner

ASYMMETRIC EXHAUST GAS RECIRCULATION SYSTEM

BACKGROUND AND SUMMARY

Turbocharged engine systems may use low-pressure cooled exhaust gas recirculation (EGR) systems which direct exhaust gas from downstream of a turbo turbine and inject the exhaust gas upstream of the turbo compressor.

For example, low-pressure EGR systems may be used on boosted engines to increase fuel economy via reduced pumping losses, increase combustion efficiency, and reduce engine knock tendencies. Further, low-pressure cooled EGR systems may also be used on diesel engines to reduce emissions of nitrogen oxides (NOx) while increasing fuel economy via an increased cooling performance and turbo efficiencies compared to traditional "high pressure" EGR systems.

Additionally, in some examples, engines with EGR systems may include twin turbochargers where each turbocharger includes a compressor arranged along separate air intake passages of the engine. For example, one approach for a V-type engine with twin turbochargers is to provide a low-pressure EGR system for each turbocharger.

However, the inventors herein have recognized issues with approaches which utilize separate low-pressure EGR systems for each turbocharger in a twin turbocharged engine. For example, using separate EGR systems may result in dual sets of EGR components and sensors leading to increased cost, packaging issues, and an increase in engine control complexity. For example, imbalances in such a configuration may increase complexity of controlling two EGR valves to achieve the same EGR rate on each bank of the engine. Further, such approaches may result in negative interactions between lubrication oil in positive crankcase ventilation (PCV) gases and the EGR system, resulting in potential EGR valve and compressor wheel contamination risks, for example.

As one example, the above issues may be addressed by a system comprising a first turbocharger in a first intake passage with a low-pressure EGR system fluidically coupling engine exhaust exiting the first turbocharger turbine to engine intake air entering the first turbocharger compressor, and a second turbocharger in a second intake passage without a low-pressure EGR system fluidically coupling engine exhaust exiting the second turbocharger turbine to engine intake air entering the second turbocharger compressor.

In this way, the number of components and sensors used in the EGR system may be reduced leading to decreased cost. Further, greater flexibility in packaging of low-pressure EGR systems may be achieved and engine control complexity in operating the EGR system may be reduced. Additionally, in such a configuration, a positive crankcase ventilation (PCV) system can be coupled to the engine bank which does not include a low-pressure EGR system which may result in reduced EGR valve/compressor contamination. Further advantages may include an increased low-pressure EGR flow capability by utilizing natural bank-to-bank imbalances to decrease exhaust back-pressure, for example, thus enabling improved fuel economy and reduced exhaust gas emissions, such as NOx.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
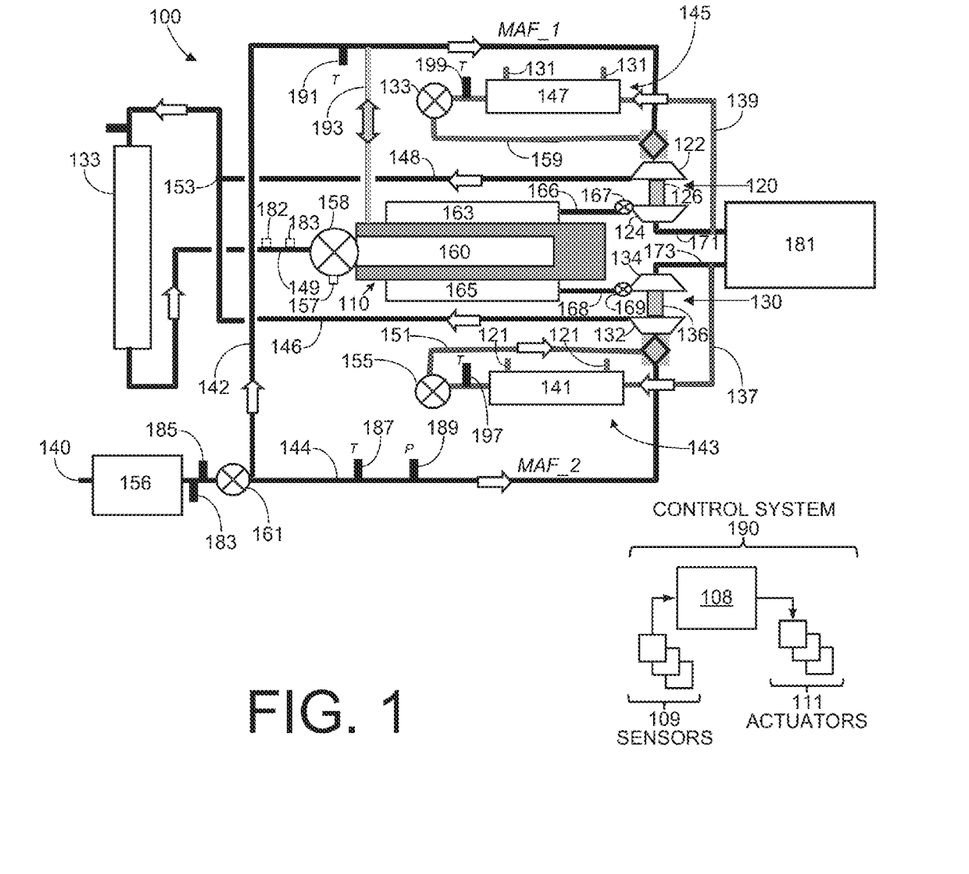
FIG. 1 shows a block diagram of a twin turbocharged engine including two EGR systems.

Systems and methods for a twin turbocharged engine with a single exhaust gas recirculation (EGR) system are disclosed. As remarked above, the inventors herein have recognized various issues with approaches which utilize separate low-pressure EGR systems for each turbocharger in a twin turbocharged engine, such as shown in FIG. 1. In contrast, FIGS. 2-3 and show example twin turbocharger engine systems which utilize a single EGR system and FIG. 4 shows an example method for directing air and exhaust gasses in such systems.

FIG. 1 shows a schematic depiction of an example engine system 100 including a multi-cylinder internal combustion engine 110, twin turbochargers 120 and 130, and exhaust gas recirculation (EGR) systems 145 and 143. As one non-limiting example, engine system 100 can be included as part of a propulsion system for a vehicle. Engine 110 may be any suitable type of engine; e.g., a gasoline engine, a diesel engine, a hybrid engine, etc.

Engine system 100 can receive intake air from air source such as ambient via intake passage 140. Intake passage 140 can include an air filter 156. At least a portion of the intake air (MAF_1) can be directed to a compressor 122 of turbocharger 120 via a first branch of the intake passage 140 as indicated at 142 and at least a portion of the intake air (MAF_2) can be directed to a compressor 132 of turbocharger 130 via a second branch of the intake passage 140 as indicated at 144. Thus, compressors 122 and 132 can receive different flow rates of intake air from a common source. Further, a valve 161 may be disposed at a branch point of conduits 144 and 142 and may be configured to control an amount of air flow delivered to conduit 144 and 142, for example, to reduce the air pressure in conduits 144 and 142 and thereby enhance the flow of EGR.

The first portion of the total intake air (MAF_1) can be compressed via compressor 122 where it may be supplied to intake manifold 160 via intake air passage 148. Thus, intake passages 142 and 148 form a first branch of the engine's air intake system. Similarly, a second portion of the total intake air (MAF_2) can be compressed via compressor 132 where it may be supplied to intake manifold 160 via intake air passage 146. Thus, intake passages 144 and 146 form a second branch of the engine's air intake system.

In some examples, as shown in FIG. 1, compressed air in intake passages 146 and 148 may be directed to a charge air cooler 133 prior to being supplied to intake manifold 160. For example, intake air passage 146 may be coupled to intake air passage 148 at a junction 153 so that compressed air from compressors 122 and 132 are combined and directed through air charge cooler 133. Cooled intake air from air charge cooler 133 may then be directed, via a common intake passage 149 into intake manifold 160. In this way, both of compressors 122 and 132 can be provide intake air to the engine via a common intake manifold. In some examples, intake manifold 160 may include an intake manifold pressure sensor 182 and/or an intake manifold temperature sensor 183, each communicating with electronic controller 108. Electronic controller 108 can comprise part of an engine control system indicated generally at 190. Intake passage 149 can include a throttle 158. The position of the throttle can be adjusted by the control system via a throttle actuator 157 communicatively coupled to controller 108. For example, in a gasoline engine, during steady state conditions, control system 190 including controller 108 can adjust the position of throttle 158 to maintain the engine at a substantially constant torque output, which can be effectively equivalent to a constant airflow rate in some examples. Thus, throttle 158 can be controlled to vary the airflow rate provided to the engine to adjust the torque produced by the engine responsive to a level of torque requested by the control system or by the vehicle operator via an accelerator pedal, for example.

An exhaust manifold on a first bank 163 of engine 110 may exhaust products of combustion via exhaust passage 166 can be directed through exhaust turbine 124 of turbocharger 120, which in turn can provide mechanical work to compressor 122 via shaft 126, thereby increasing the boost pressure provided to the engine cylinders. Similarly, an exhaust manifold on a second bank 165 of engine 110 may exhaust products of combustion via exhaust passage 168 to be directed through exhaust turbine 134 of turbocharger 130, which in turn can provide mechanical work to compressor 132 via shaft 136, thereby further increasing the boost pressure provided to the engine cylinders.

For the purposes of this disclosure, the term "bank" may be interpreted as a group of cylinders that feed a single turbine in a turbocharger system. For example, in a twin-turbo 14 configuration, a bank would consist of a group of two cylinders, for a twin turbo V8 engine a bank may consists of a group of four cylinders joined together in a manifold before feeding a single turbine, etc.

In some examples, turbines 124 and 134 may be sized to deliver a suitable level of work to their respective compressors over a variety of different operating conditions. During some conditions, such as at higher engine torques, more exhaust gas than is necessary to provide the requested boost pressure may be supplied to the turbines. Therefore, turbines 124 and 134 may include a bypass passages and wastegates (not shown) that may be opened once a threshold boost pressure or corresponding compressor pressure ratio is attained so that excess exhaust gas energy can diverted through the turbine bypass, thereby limiting the boost pressure and corresponding compressor pressure ratio to a particular value or range of values.

In some examples, exhaust passages 166 and 168 may include exhaust valves 167 and 169 disposed upstream of turbine 124 in passage 166 and upstream of turbine 134 in passage 168, respectively. Valves 167 and 169 may be adjusted via controller 108 to control an amount of exhaust gas delivered to the turbines during select engine operating conditions.

Exhaust gas exiting the turbines 124 and 134 may be directed to an exhaust treatment system 181, via exhaust conduits 171 and 173, respectively. For example, exhaust gas may be passed through various catalysts, filters, etc, before being directed out a tailpipe to the ambient.

In some examples, as shown in FIG. 1, engine system 100 may also include a positive crankcase ventilation duct 193 coupled between passage 142 and the crankcase of engine 110.

By way of example, FIG. 1 shows two separate low-pressure EGR systems coupled to the two separate turbocharger systems. In particular, a first low-pressure EGR system 143 is configured to fluidically couple exhaust exiting the turbocharger 130 to intake air entering turbocharger 130. Thus, EGR system 143 includes a passage 137 coupled between conduit 173 downstream of turbine 134 to direct exhaust gas exiting turbocharger 130 into an EGR cooler 141. A passage 151 is coupled to EGR cooler 141 and passage 144 at a position upstream of compressor 132 to direct EGR gasses from EGR cooler 141 into turbocharger 130. Further, EGR system 143 includes an EGR valve 155 disposed in passage 151 to control an amount of EGR flow delivered to turbocharger 130.

In the example shown in FIG. 1, a second low-pressure EGR system 145 is configured to fluidically couple exhaust exiting the turbocharger 120 to intake air entering turbocharger 120. Thus, EGR system 145 includes a passage 139 coupled between conduit 171 downstream of turbine 124 to direct exhaust gas exiting turbocharger 120 into an EGR cooler 147. A passage 159 is coupled to EGR cooler 147 and passage 142 at a position upstream of compressor 122 to direct EGR gasses from EGR cooler 147 into turbocharger 120. Further, EGR system 145 includes an EGR valve 133 disposed in passage 159 to control an amount of EGR flow delivered to turbocharger 120.

Further, coolant lines may be coupled with the EGR coolers in the EGR systems to communicate with an engine coolant system, radiator, etc. for example EGR cooler 141 has coolant lines 121 coupled thereto and EGR cooler 147 has coolant lines 131 coupled thereto.

Engine system 100 can include various other sensors communicating with controller 108 of control system 190. For example, a mass air flow (MAF) sensor 183 and a relative humidity (RH) sensor 185 may be disposed upstream of valve 161 in air passage 140. A temperature sensor 187 and a pressure sensor 189 may be disposed in conduit 144, a temperature sensor 191 may be disposed in conduit 142, a temperature sensor 197 may be disposed in conduit 151 in EGR system 143 and temperature sensor 199 may be disposed in conduit 159 in EGR system 145.

Control system 190 can include one or more engine system controllers including at least controller 108 and each can be configured to communicate with the various sensors 109 and actuators 111 described herein. As one example, controller 108 can include an input/output interface for sending and receive electronic signals with the various sensors and actuators, a central processing unit including memory, such as random accessible memory (RAM), read-only memory (ROM), keep alive memory (KAM), each of which can communicate via a data bus. Controller 108 may include a proportional-integral-derivative (PID) controller in some examples. However, it should be appreciated that other suitable controllers may be used as can be appreciated by one skilled in the art in light of the present disclosure.

Controller 108 of control system 190 can receive an indication of vehicle operator input via one or more user input devices. For example, an accelerator pedal may include an accelerator pedal position sensor that provides an indication of accelerator pedal position as operated by a vehicle operator. Similarly, a transmission gear selector including a sensor can provide an indication of the transmission gear selected by the vehicle operator.

Controller 108 of control system 190 can be configured to vary one or more operating parameters of the engine on an individual cylinder basis. For example, the control system can adjust valve timing by utilizing a variable cam timing (VCT) actuator, spark timing by varying the time at which the spark signal is provided to the spark plug, and/or fuel injection timing and amount by varying the pulse width of the fuel injection signal that is provided to the fuel injector by the control system.

As remarked above, the inventors herein have recognized various issues with approaches which utilize separate low-pressure EGR systems for each turbocharger in a twin turbocharged engine, such as shown in FIG. 1. For example, using separate EGR systems may result in dual sets of EGR components and sensors leading to increased cost, packaging issues, and an increase in engine control complexity. Further, imbalances in such a configuration may increase complexity of controlling two EGR valves to achieve the same EGR rate on each bank of the engine. In addition, such approaches may result in negative interactions between lubrication oil in positive crankcase ventilation (PCV) gases and the EGR system, resulting in potential EGR valve and compressor wheel contamination risks, for example.

In order to at least partially address these issues, a single low-pressure EGR system may be used advantageously in a twin turbo engine system, as shown for example in FIGS. 2-3 described below. In particular, a system is provided comprising a first turbocharger in a first intake passage with a low-pressure EGR system fluidically coupling exhaust exiting the first turbocharger to intake air entering the first turbocharger, and a second turbocharger in a second intake passage without a low-pressure EGR system fluidically coupling exhaust exiting the second turbocharger to intake air entering the second turbocharger.

Figure 2:
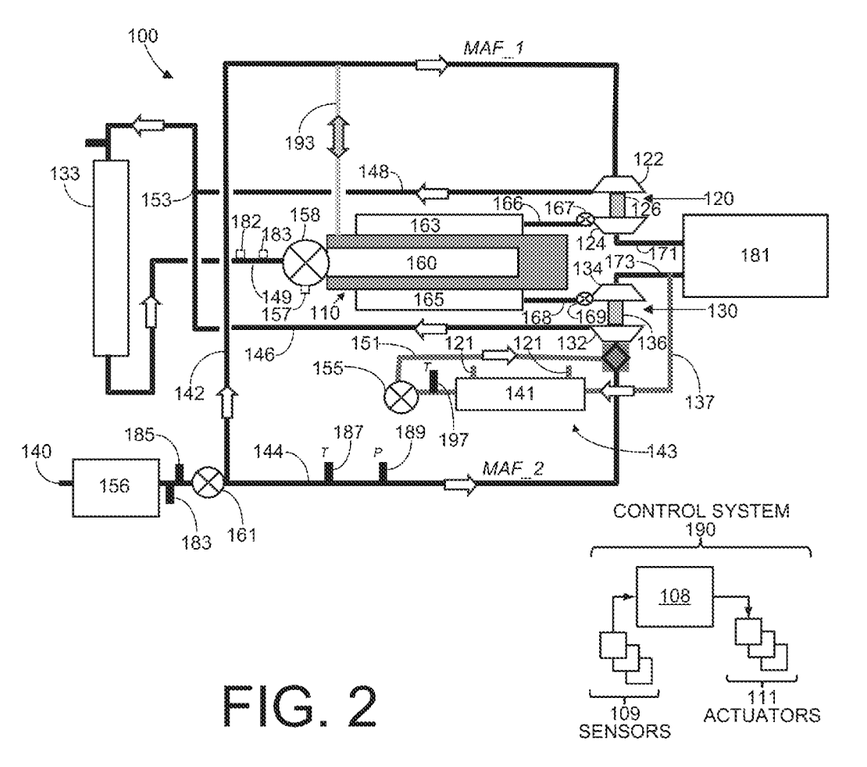
FIG. 2 shows a block diagram of an example twin turbocharged engine including an EGR system in accordance with the disclosure.

Turning now to FIG. 2, a block diagram of an example twin turbocharged engine system 100 including an EGR system 143 in accordance with the disclosure, is shown. The numbered elements shown in FIG. 2 correspond to the number elements in FIG. 1 described above.

In the system shown in FIG. 2, first and second turbochargers are positioned in parallel with one another and maintained separate from before a low pressure EGR system is coupled to the intake air of the first turbocharger to downstream of the first and second turbochargers. The low pressure EGR system coupled to a first turbocharger is coupled exclusively with the first turbocharger via a valve and an EGR cooler so that the engine banks are separate on the intake side form the EGR entry point, through the first compressor to a point downstream of each compressor. Further, the banks are separate on the exhaust side from the engine to turbine outlets. However, the banks come together before entering the engine. For example, conduit 146 and 148 may be coupled before the charger air cooler 133, within charger air cooler 133, or after charger air cooler 133.

In particular, FIG. 2 shows a single low-pressure EGR system 143 configured to fluidically couple exhaust exiting the turbocharger 130 to intake air entering turbocharger 130. Thus, EGR system 143 includes a passage 137 coupled between conduit 173 downstream of turbine 134 to direct exhaust gas exiting turbocharger 130 into an EGR cooler 141. A passage 151 is coupled to EGR cooler 141 and passage 144 at a position upstream of compressor 132 to direct EGR gasses from EGR cooler 141 into turbocharger 130. Further, EGR system 143 includes an EGR valve 155 disposed in passage 151 to control an amount of EGR flow delivered to turbocharger 130. In some examples the EGR take-off point downstream of turbocharger 130 via conduit 137 may be positioned after exhaust conduits 171 and 173 are joined together in a common exhaust conduit. In other examples, the EGR take-off point downstream of turbocharger 130 via conduit 137 may be positioned before exhaust conduits 171 and 173 are joined together in a common exhaust conduit, as shown in the FIGS. Further, in some examples, the EGR take-off point downstream of turbocharger 130 via conduit 137 may be positioned downstream of exhaust treatment system 181 so that EGR gasses may be cleaned by exhaust treatment system 181 before being reintroduced into the engine.

In contrast to FIG. 1 shown above, the system shown in FIG. 2 does not include a second EGR system coupled to turbocharger 120 but rather includes a first turbocharger 130 in a first intake passage 144 with a low-pressure EGR system 143 fluidically coupling exhaust exiting the first turbocharger 130 to intake air entering the first turbocharger 130, and a second turbocharger 120 in a second intake passage 142 without a low-pressure EGR system fluidically coupling exhaust exiting the second turbocharger to intake air entering the second turbocharger.

In this example, the low pressure EGR system 143 is coupled exclusively to intake passage 144 into turbocharger 130 via a valve 155 and EGR cooler 141 and does not mix with intake passage 142 coupled to turbocharger 120. Thus, in some examples, PCV system 193 may be plumbed to the non-EGR engine bank to deliver PCV gases to the intake passage 142 of turbocharger 120 which may reduce potential EGR valve/compressor contamination, for example.

As another example, an alternative embodiment of a twin turbocharged engine system 100 including an EGR system 143 in accordance with the disclosure, is shown. The numbered elements shown in FIG. 3 also correspond to the number elements in FIG. 1 described above.

Figure 3:
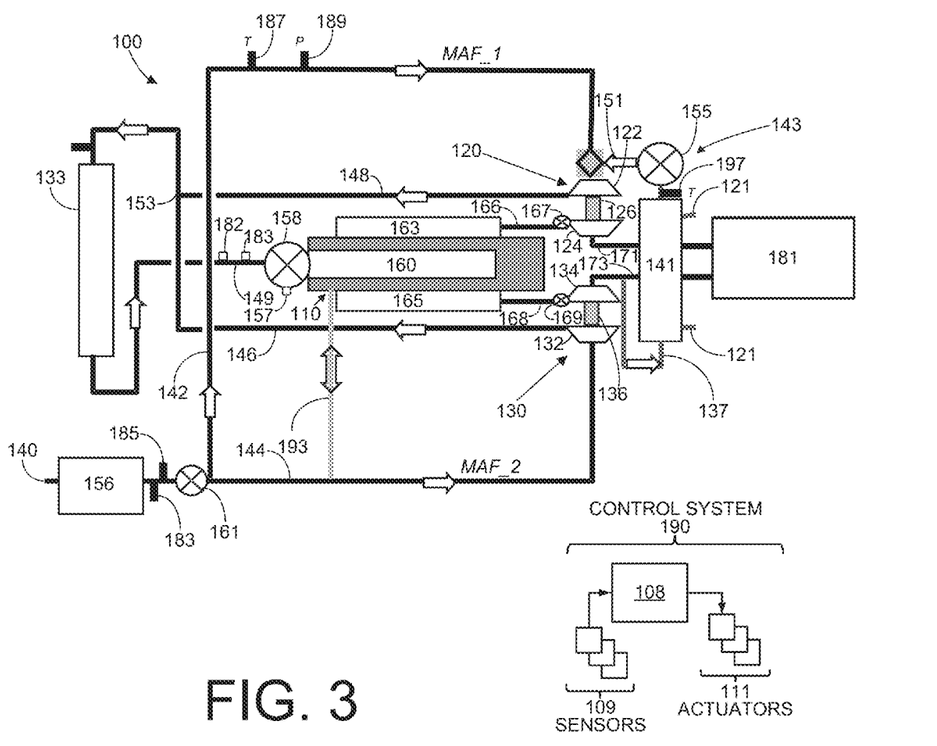
FIG. 3 shows a block diagram of another example twin turbocharged engine including an EGR system in accordance with the disclosure.
Figure 4:
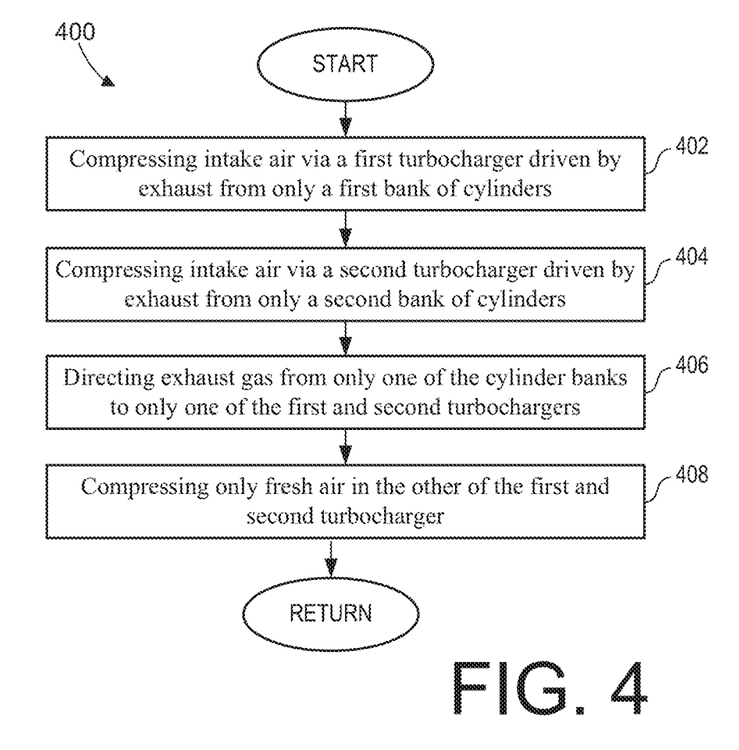
FIG. 4 shows an example method 400 for operating a twin turbocharged engine system including an EGR system in accordance with the disclosure.

In particular, FIG. 3 shows a mixed EGR system which draws exhaust gas from exhaust line 173 coupled to turbocharger 130 and outputs EGR gasses into the intake passage 142 of the other turbocharger 120. The single low-pressure EGR system 143 shown in FIG. 3 is configured to fluidically couple exhaust exiting the turbocharger 130 to intake air entering turbocharger 120. Thus, EGR system 143 includes a passage 137 coupled between conduit 173 downstream of turbine 134 to direct exhaust gas exiting turbocharger 130 into an EGR cooler 141. A passage 151 is coupled to EGR cooler 141 and passage 142 at a position upstream of compressor 122 to direct EGR gasses from EGR cooler 141 into turbocharger 120. Further, EGR system 143 includes an EGR valve 155 disposed in passage 151 to control an amount of EGR flow delivered to turbocharger 120.

In this example, since the EGR system supplies EGR gasses to turbocharger 120, in some examples, PCV system 193 may be plumbed to intake passage 144 to deliver PCV gases to the intake passage 144 which is not associated with turbocharger 120 which may reduce potential EGR valve/compressor contamination, for example.

Further, in the example shown in FIG. 3 intake passage may include a temperature sensor 187 and a pressure sensor 189 disposed therein, rather than disposed in intake passage 144 as shown in FIGS. 1 and 2. In this way, temperature sensor 187 and pressure sensor 189 in passage 142 may be used to determine adjustments in EGR system 143 via EGR valve 155, for example.

Various advantages may be achieved in the systems shown in FIGS. 2-3 as compared with the system shown in FIG. 1. For example, such systems may include a larger low-pressure EGR cooler and/or other EGR components for a single bank solution, which may result in lower intake manifold charge temperatures and increase fuel economy. Further, the number of components and sensors used in the EGR system may be reduced leading to decreased costs, greater flexibility in packaging of low-pressure EGR systems may be achieved and engine control complexity in operating the EGR system may be reduced. Additionally, in such a configuration, a positive crankcase ventilation (PCV) system can be coupled to the engine bank which does not include a low-pressure EGR system which may result in reduced EGR valve/compressor contamination. Further advantages may include an increased low-pressure EGR flow capability by utilizing natural bank-to-bank imbalances to decrease exhaust back-pressure, for example.

Turning now to FIG. 4, a method 400 for operating a twin turbocharged engine system including an EGR system, e.g., the engine systems shown in FIGS. 2 and 3 above, is shown.

At 402, method 400 includes compressing intake air via a first turbocharger driven by exhaust from only a first bank of cylinders. For example, with reference to FIGS. 2 and 3 described above, intake air delivered to turbocharger 130, which is driven by exhaust from bank 165 via exhaust conduit 168, may be compressed by compressor 132.

At 404, method 400 includes compressing intake air via a second turbocharger driven by exhaust from only a second bank of cylinders. For example, with reference to FIGS. 2 and 3 described above, intake air delivered to turbocharger 120, which is driven by exhaust from bank 163 via exhaust conduit 166, may be compressed by compressor 122.

At 406, method 400 includes directing exhaust gas from only one of the cylinder banks to only one of the first and second turbochargers. For example, with reference to FIG. 2, exhaust gas is directed from cylinder bank 165 via conduits 173 and 137 through EGR system 143 into compressor 132 of turbocharger 130. As another example, with reference to FIG. 3, exhaust gas is directed from cylinder bank 165 via conduits 173 and 137 through EGR system 143 into compressor 122 of turbocharger 120.

In particular, the turbochargers 130 and 120 are separately coupled to separate banks 165 and 163 of the engine, respectively, so that exhaust gas from bank 165 is fed to turbocharger 130 but not to turbocharger 120 and exhaust gas from bank 163 is fed to turbocharger 120 but not to turbocharger 130. Further, as described above, intake air is split into two separate intake conduits 144 and 142 which is fed to the two separate turbochargers 130 and 120, respectively, so that the intake air is compressed. Compressed air from the separate turbochargers is then directed into a charge air cooler 133 and combined to enter the intake manifold 160 of the engine. Throttle 158 may be adjusted to vary the amount of combined compressed intake air provided to the engine.

At 408, method 400 includes compressing only fresh air in the other of the first and second turbocharger. For example, with reference to FIG. 2, compressor 122 compresses only fresh air from conduit 142 in turbocharger 120. In this example, there is no EGR entering compressor 122 since the EGR system 143 is exclusively coupled to the other turbocharger 130.

As another example, with reference to FIG. 3, compressor 132 compresses only fresh air from conduit 144 in turbocharger 130. In this example, there is no EGR entering compressor 132 since the output from EGR system 143 is coupled to the other turbocharger 120. In particular in this example, exhaust gas from bank 165 is directed to EGR system 143 and output to turbocharger 120 coupled to the other engine bank 163.

Twin turbo engines may have natural bank-to-bank imbalances due to bank-to-bank backpressures and depression differences as well as part-to-part and controls variations. For the single bank EGR system shown in FIG. 2 or the mixed bank scenario shown in FIG. 3, the extra EGR running through one turbo compressor may approximately replace a like amount of fresh air that would normally run through that compressor. This fresh air may be accounted for by the extra fresh air running through the non-EGR compressor.

In contrast to asymmetric high pressure EGR systems, single or mixed bank EGR can provide different temperatures and densities in front of each compressor and may be roughly self-balancing so that turbocharger sizing from the dual bank systems may be carried over to a single or mixed bank system.

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various acts, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated acts or functions may be repeatedly performed depending on the particular strategy being used.

Further, the described acts may graphically represent code to be programmed into the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and nonobvious combinations and subcombinations of the various systems and configurations, and other features, functions, and/or properties disclosed herein.

The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:
1. A system, comprising:
   first and second parallel intake passages;
   first and second turbochargers, each with a turbine and a compressor;
   first and second parallel exhaust passages;

wherein the compressor of the first turbocharger is in the first intake passage, the turbine of the first turbocharger is in the first exhaust passage, the compressor of the second turbocharger is in the second intake passage, and the turbine of the second turbocharger is in the second exhaust passage; and an EGR passage coupling only the first exhaust passage to only the second intake passage, where there is no fluid coupling from the second exhaust passage to either of the first and second intake passages.

2. The system of claim 1, wherein the first and second intake passages join downstream of where the EGR passage couples to the second intake passage and downstream of the compressors of the respective turbochargers into a charge air cooler.

3. The system of claim 1, further comprising a Positive Crankcase Ventilation (PCV) duct delivering PCV gases only to the first intake passage.

4. The system of claim 1, wherein the compressor of the first turbocharger compresses only fresh air with no EGR entering the compressor.

5. The system of claim 1, wherein the system is coupled to a V-type engine with first and second cylinder banks, with the first exhaust passage coupled exclusively to respective turbochargers, the first intake passage and the first exhaust passage coupled to the first cylinder bank and the second intake passage and the second exhaust passage coupled to the second cylinder bank.

6. The system of claim 1, wherein the EGR passage coupling only the first exhaust passage to only the second intake passage is coupled via a valve and an EGR cooler.

7. The system of claim 6, further comprising coolant passages coupled to the EGR cooler and an engine coolant system.

8. The system of claim 1, wherein the first and second intake passages are maintained separate from each other from before the EGR passage couples to only the second intake passage to downstream of both turbines and wherein compressed gases from both the first and second parallel intake passages are combined before entering a charge air cooler.

9. The system of claim 1, wherein the EGR passage coupling only the first exhaust passage to only the second intake passage is a low-pressure EGR passage coupled between the first exhaust passage downstream of the turbine in the first exhaust passage and the second intake passage upstream of the compressor in the second intake passage.

10. A system, comprising:
first and second parallel intake passages;
first and second parallel exhaust passages;
a first turbocharger with a first turbine in the first exhaust passage and a first compressor in the first intake passage;
a second turbocharger with a second turbine in the second exhaust passage and a second compressor in the second intake passage;
first and second cylinder banks; and
a single low-pressure EGR passage coupling only one of the exhaust passages to only one of the intake passages from downstream of one of the first and second turbines to upstream of one of the first and second compressors, where there is no fluid coupling from another of the exhaust passages to either of the first and second intake passages;
wherein only the first turbocharger is driven by exhaust from the first cylinder bank, and only the second turbocharger is driven by exhaust from the second cylinder bank; and
wherein the first and second cylinder banks are different cylinder banks.

11. The system of claim 10, wherein the single low-pressure EGR passage coupling only one of the exhaust passages to only one of the intake passages from downstream of one of the first and second turbines to upstream of one of the first and second compressors is coupled via a valve and an EGR cooler; and
wherein each of the first and second cylinder banks is a group of cylinders that feeds a single turbine.

12. The system of claim 10, wherein the first and second intake passages are maintained separate from each other from before where the single low-pressure EGR passage couples to only one of the intake passages, upstream of one of the first and second compressors, to downstream of both the first and second turbines.

13. The system of claim 10, further comprising a Positive Crankcase Ventilation (PCV) duct delivering PCV gases only to the intake passage that is not coupled to the low-pressure EGR passage and wherein one turbocharger compresses only fresh air.

14. The system of claim 10, further comprising a charge air cooler coupled to compressed gases from both the first and second parallel intake passages and wherein the compressed gases from both the first and second parallel intake passages are combined before entering the charge air cooler.

15. The system of claim 10, where exhaust gas recirculation from the single low-pressure EGR passage is directed into one of the first and second compressors and no exhaust gas recirculation enters another of the first and second compressors.

* * * * *